June 30, 1942. C. E. FRUDDEN 2,287,982
OIL FILTER
Filed May 22, 1940

Inventor
C. E. Frudden
by
Attorney

Patented June 30, 1942

2,287,982

UNITED STATES PATENT OFFICE 2,287,982

OIL FILTER

Conrad E. Frudden, Wauwatosa, Wis., assignor to Allis-Chalmers Manufacturing Company, Milwaukee, Wis., a corporation of Delaware Application May 22, 1940, Serial No. 336,487

8 Claims. (Cl. 210—131)

This invention relates to a filter, and is shown as being applied to an oil filter of the type disclosed in the patents to R. M. Bruesewitz 2,078,525 and C. E. Frudden 2,179,784. This filter comprises a base provided with inlet and outlet ports, and a filter cartridge mounted on the base in communication with said ports. The filter cartridge comprises a container, hereafter termed a can, containing a mass of filtering material therein, a central, axial recess being provided in the mass of filtering material to receive an inlet tube mounted on the filter base and communicating with the inlet port therein.

It is to be understood that these filter cartridges lend themselves to production in large quantities. Any modification in construction which facilitates assembly of the cartridges, or application of cartridges in position on their bases, is of great importance in reducing the cost of manufacture.

In the construction of the prior art, a mass of filtering material is placed in a can, a central axial recess is located in said material by means of an air nozzle, as described in the above Bruesewitz Patent 2,078,525, and a filler stick is inserted in the recess to maintain the shape thereof. When it is desired to mount the cartridge on a filter base, a foraminous disk for retaining the filtering material is placed on the base around the bottom end of the inlet tube, the stick is pulled out of the central recess of the cartridge, and the cartridge carefully placed on the base in inverted position, care being taken to insert the inlet tube in the central recess of the filtering material. If care were not taken during this operation, the inlet tube may disarrange the material in the cartridge, destroying the central axial recess, and making it impossible to use the cartridge without returning it for location of another central recess therein.

In accordance with the present invention, the can is provided with an internal flange or internal projections adjacent the open end thereof. After the mass of filtering material has been inserted in the can and a central axial recess formed therein, a resilient foraminated retaining disk having a normal diameter greater than the diameter of the can opening as reduced by the flange or projections, is inserted into the can through the opening. The retainer disk preferably comprises a frusto-conical disk with an axial sleeve or hub at its center which fits into the central recess in the filtering material and holds it in place, doing away with the need for the filler stick formerly used. The retaining member also protects the filtering material against accidental damage.

It will be noted that, with the cartridge provided with a conical retainer having a central opening, as described above, it is a simple matter to insert the cartridge in inverted position on the base over the inlet tube, since the conical retainer plate guides the inlet tube to its proper location in the cartridge without possibility of disarranging the filtering material. Therefore, great care in assembling the cartridge on the base is no longer necessary.

While different types of retainers may be used, the preferred type is a thin, frusto-conical disk with a short axial sleeve extending from the center, and a plurality of radial slots extending inward from the periphery to make the periphery flexible and to provide passage for the fluid being filtered.

It is an object of this invention to provide a filter which is simple and inexpensive and lends itself to mass production.

It is another object of this invention to provide a filter comprising a container having a resilient retainer disk which is axially insertible and which facilitates assembly of the filter.

It is a further object of this invention to provide, in a filter cartridge containing a mass of insulating material having a central axial recess therein, a retainer comprising a conical resilient disk provided with a central sleeve fitting into said recess and protecting said filtering material against disarrangement.

It is a further object of this invention to provide a filter retainer comprising a conical disk having an axial sleeve adjacent the center thereof and a plurality of radial slots arranged at the periphery thereof.

Referring now to the drawing.

Figure 1:
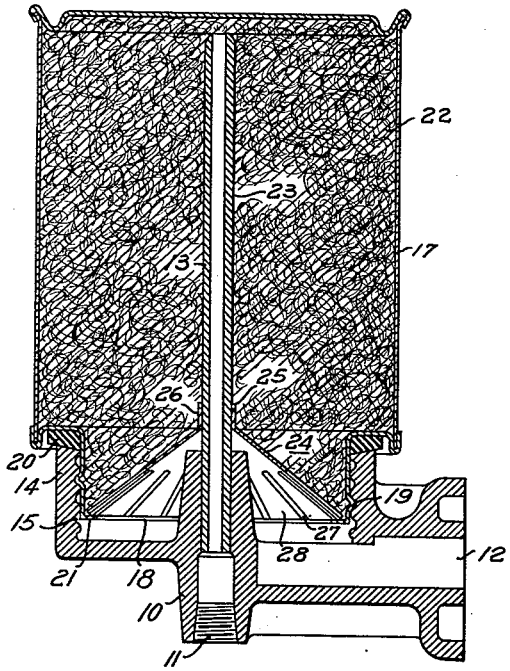
Fig. 1 is a vertical central section of a filter construction in accordance with this invention.

Referring to the drawing in detail, Fig. 1 shows a filter comprising a base 10 provided with an inlet port 11 and outlet port 12, a central inlet tube 13 being rigidly supported in base 10 and communicating with inlet port 11 to carry the fluid to be filtered into the cartridge. A cylindrical portion 14 of the base is threaded at 15. The cartridge comprises a container or can 17 open at 18, the neck of the can being threaded at 19 to coact with the threads 15 of cylindrical portion 14 of the base. A suitable gasket 20 is inserted between can 17 and base 10.

Figure 2:
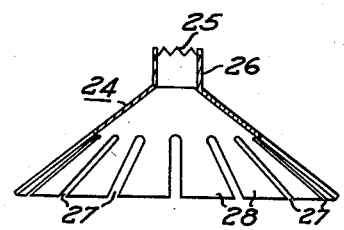
Fig. 2 is an enlarged vertical central section of a preferred form of filter retainer.
Figure 3:
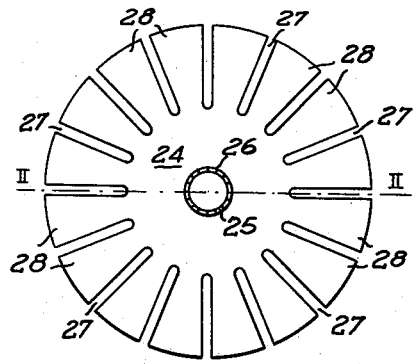
Fig. 3 is a plan view of same.

Adjacent the opening 18, the can is provided with an internal flange 21, which may be replaced by internal projections, if desired. The can 17 is filled with a mass of filtering material 22, in which a central axial recess 23 is formed to receive tube 13. A filtering material retainer or closure 24, best shown in Figs. 2 and 3, is arranged within can 17 adjacent the opening 18, the periphery of retainer 23 being retained by flange or projections 21, while the central axial sleeve or hub 26 thereof fits within the recess 23 and surrounds tube 13. Retainer 24 is preferably frusto-conical in form and may be provided with a plurality of radial slots 27. The slots 27 render the fingers 28 between them sufficiently flexible to permit the retainer disk to be thrust into can 17 through the reduced opening 18. If the disk is thrust into the can, the fingers 28 yield sufficiently to pass the flange or projections 21, after which they resume their normal position, so that the retainer 24 is adequately retained by flange 21.

When disk 24 is so located, hub or sleeve 26 thereof, which may be provided with a sawtooth edge 25, fits into the end of recess 23, protecting the cotton mass and recess against possible disarrangement. When the finished cartridge is inverted and applied to base 10, retainer 24 guides tube 13 into axial sleeve 26 and recess 23, so that little care need be used in making the assembly.

Figure 4:
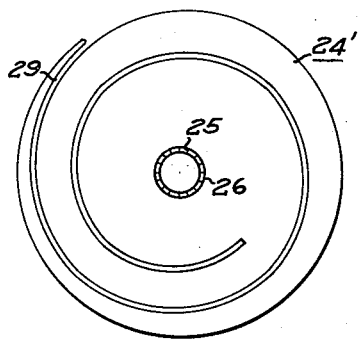
Fig. 4 is a plan view of a modified form of retainer.

Disk 24 may be rendered flexible in any desired manner. An alternative construction is shown in Fig. 4, wherein a spiral slot 29 is arranged in disk 24', extending inward from the periphery thereof. This retainer can be used in the same manner as retainer 24 of Figs. 2 and 3, spiral slot 29 making the retainer sufficiently flexible to permit its insertion into can 17. After insertion in the can, retainer 24' resumes its normal diameter, and is retained by flange 21 in the same manner as described above with reference to retainer 24.

The above description is for purposes of illustration only. Modifications and changes which will readily occur to those skilled in the art come within the scope of the invention and of the claims appended hereto.

It is claimed and desired to secure by Letters Patent:

1. A filter provided with an inlet port and an outlet port and comprising a container having an opening at one end thereof, filtering material within said container, an internal peripheral flange adjacent said opening, and a retainer for said filtering material comprising a disk provided with a central opening communicating with one of said ports and an apertured, discontinuous, resilient peripheral portion which, in its normal unstressed condition, is larger in diameter than said flanged opening, whereby said retainer may be inserted into said container through said flanged opening.

2. A filter provided with an inlet and an outlet and comprising a casing having an opening provided with an internal flange, filtering material within said container, and a foraminated closure for said casing comprising a conical flexible disk having a normal diameter larger than said flanged opening, said disk being provided with a plurality of radial slots extending inward from the periphery thereof, whereby said disk is rendered sufficiently compressible to pass through said flanged opening.

3. A filter retainer comprising a conical disk of flexible material having a plurality of radial slots extending inward from the periphery thereof, rendering said disk perforate and flexible at its periphery.

4. A filter comprising a can having a central opening surrounded by an internal flange, a mass of filtering material within said can provided with a central longitudinal recess, and a retainer comprising a central sleeve fitting within said recess and a circular resilient apertured peripheral portion having, in its unstressed condition, a diameter greater than said flanged opening, whereby said retainer may be inserted into said can through said flanged opening.

5. A filter comprising a base provided with an inlet port and an outlet port, a container having an open end seated within said base, a mass of filtering material within said container provided with a central recess, a tube extending from said base centrally of said container within said recess and communicating with one of said ports, and a disk provided with an apertured hub fitting around said tube, said disk being provided with an apertured, discontinuous, resilient peripheral portion having a normal diameter greater than the diameter of said open end of said container, whereby said disk may be inserted into said container through said opening.

6. A filter as defined in claim 5, wherein said disk is frusto-conical, said hub being at the small end thereof, and said peripheral apertures comprising a plurality of radial slots provided in said disk adjacent the periphery thereof.

7. A filter as defined in claim 5, wherein said resilient disk is provided with a spiral slot extending inward from the periphery thereof.

8. A filter cartridge comprising a cylindrical can provided with an opening at one end and internal projections adjacent said opening, a mass of filtering material within said container provided with a central axial recess, and an apertured retainer for said can provided with an axial central sleeve fitting into said recess, said retainer being retained at its periphery by said projections, the normal unstressed diameter of said retainer at its periphery being larger than the diameter of said can opening as modified by said projections, said retainer being resilient, whereby it may be inserted into said can through said opening.

CONRAD E. FRUDDEN.